United States Patent
Goulet

(10) Patent No.: US 9,950,765 B2
(45) Date of Patent: Apr. 24, 2018

(54) ORTHOTIC BICYCLE PEDALS

(71) Applicant: Edward Goulet, Santa Cruz, CA (US)

(72) Inventor: Edward Goulet, Santa Cruz, CA (US)

(*) Notice: Subject to any disclaimer, the term of this patent is extended or adjusted under 35 U.S.C. 154(b) by 235 days.

(21) Appl. No.: 14/989,410

(22) Filed: Jan. 6, 2016

(65) Prior Publication Data

US 2016/0221633 A1 Aug. 4, 2016

Related U.S. Application Data

(60) Provisional application No. 62/109,440, filed on Jan. 29, 2015.

(51) Int. Cl.
*B62M 3/08* (2006.01)
*B62M 3/00* (2006.01)

(52) U.S. Cl.
CPC .............. *B62M 3/086* (2013.01); *B62M 3/00* (2013.01); *B62M 3/08* (2013.01)

(58) Field of Classification Search
CPC .......... B62M 3/08; B62M 3/086; B62M 3/16; B62M 3/083; A63B 22/06; A63B 2022/0647; A63B 2022/0652
See application file for complete search history.

(56) References Cited

U.S. PATENT DOCUMENTS

| | | | |
|---|---|---|---|
| 543,806 A | 7/1895 | Graham | |
| 4,942,778 A * | 7/1990 | Bryne | B62M 3/086 36/131 |
| 4,973,046 A * | 11/1990 | Maxwell | A63M 21/00178 482/60 |
| 5,449,332 A * | 9/1995 | Hervig | A63B 22/0046 482/57 |
| 5,628,710 A * | 5/1997 | Hervig | A63B 22/0046 482/57 |
| 5,901,617 A * | 5/1999 | Hervig | B62M 3/08 482/57 |
| 5,927,155 A | 7/1999 | Jackson | |
| 6,003,408 A * | 12/1999 | Hervig | B62M 3/08 482/57 |
| 6,241,639 B1 * | 6/2001 | Hervig | A63B 22/0046 482/57 |
| 6,688,192 B1 * | 2/2004 | Badarneh | A63B 22/16 74/560 |
| 7,228,760 B2 | 6/2007 | Reboullet | |
| 2005/0155452 A1 | 7/2005 | Frey | |
| 2005/0284253 A1 | 12/2005 | Hervig | |
| 2009/0158888 A1 | 6/2009 | Coderre | |

* cited by examiner

*Primary Examiner* — Richard W Ridley
*Assistant Examiner* — Brian J McGovern
(74) *Attorney, Agent, or Firm* — Donald R. Boys; Central Coast Patent Agency, LLC

(57) ABSTRACT

An orthotic pedal apparatus for a bicycle has a pedal post having a central first axis and a male threaded portion for engaging female threads in a crank arm of a bicycle crank assembly, a pedal body having a linear bore arrangement with bearings mounting the body rotationally on the pedal post, and a mechanism for adjusting and securing position of the body at different positions along the direction of the axis of the pedal post, and a foot platform mounted rotationally above the pedal body to rotate on a second axis at a right angle to the axis of the pedal post, the foot platform supported on spring elements between the pedal body and the foot platform on both sides of the second rotational axis, the spring elements tending to return the foot platform to a position parallel to the pedal body.

6 Claims, 7 Drawing Sheets

ORTHOTIC BICYCLE PEDALS

CROSS REFERENCE TO RELATED DOCUMENTS

The present application claims priority to Provisional Application Ser. No. 62/109,440, filed Jan. 29, 2015, and all disclosure of the provisional application is incorporated herein at least by reference.

BACKGROUND OF THE INVENTION

1. Field of the Invention

The present invention is in the technical area of bicycle cranks and pedals, and pertains more specifically to a bicycle pedal and mounting assembly that provides several degrees of adjustability to both compensate for differences in hip, knee and ankle structure and function among different users of a bicycle, and to provide rehabilitation exercise for users that have chronic joint problems, particularly with the knee joint.

2. Description of Related Art

It is quite well known in the art that different persons have different anatomical features and alignment of elements of the lower body, and that a single bicycle pedal and crank arrangement will not be suitable for all such persons. Further, some people may suffer injury or at least discomfort using a crank and pedal arrangement that might be perfectly suitable for another person. One of the differences between persons that contribute to this situation are, for example, a difference in the length of legs among different people, and indeed, the fact that one person may exhibit one leg longer than the other.

Another difference is in hip structure. The human hip anatomy evolved for efficient upright walking, and typically operates such that a person's steps are substantially in-line, rather than widely separated side-to-side. This situation is important in what is known as Q-Factor in a crank assembly for a bicycle. Q-Factor is the distance horizontally across the cranks between the points where pedals may be attached. If this distance is large a user's legs will be too far separated, and unnatural forces may impinge on the ankles, knees and hips.

Yet another difference is in patella placement and action among different people. The human patella (knee cap) rides in a groove in the end of the femur, is stabilized by ligaments and tendons, and tracks in movement with the aid of certain muscles in and around the knee. The function of the patella may be affected by hip and ankle structure and operation, and in certain situations persons may suffer what is known as patella tracking disorder (PTD), and Patella Femoral Pain Syndrome (PFPS), known in one manifestation as chondromalacia patella, which may be described as softening of the anterior (back or behind) cartilage of the kneecap.

Still another difference is in ankle anatomy and function among different people. In different people the ankle may be neutral (Straight up and down), or may tend to either of pronation or supination. In pronation the foot tilts outward, the ankle inward, and in supination just the opposite. If a person's ankles pronate, that person will be uncomfortable using a crank and pedal arrangement that is more suitable for a person who's ankles supinate (and vice-versa).

And it should be considered that the anatomy and function of the hips, the knees and the ankles are all interconnected, and a problem in one region will inevitably be translated to other regions. So it should be apparent that a crank and pedal arrangement should best be designed for the anatomy and functional characteristics of each individual, although this is, in the art, a difficult and expensive proposition. Further it may be apparent that if a crank and pedal arrangement is perfectly suited to one individual, that that individual might benefit from some rather slight changes in perhaps crank length, Q-factor, and pedal angles to pronate or supinate just a bit, which might tend to help strengthen muscles and tendons, and even correct anatomy to some degree.

What is clearly needed in the art is a crank and pedal apparatus that may have several degrees of adjustability to be able to accommodate anatomical and functional differences among users, and may also serve to provide therapeutic exercise for persons suffering from conditions like PTD and PFPS, for example.

BRIEF SUMMARY OF THE INVENTION

In one embodiment of the invention an orthotic pedal apparatus for a bicycle is provided, comprising a pedal post having a central first axis and a male threaded portion for engaging female threads in a crank arm of a bicycle crank assembly, a pedal body having a linear bore arrangement with bearings mounting the body rotationally on the pedal post, and a mechanism for adjusting and securing position of the body at different positions along the direction of the central first axis of the pedal post, and a foot platform mounted rotationally above the pedal body to rotate on a second axis at a right angle to the first axis of the pedal post, the foot platform supported on spring elements between the pedal body and the foot platform on both sides of the second rotational axis, the spring elements tending to return the foot platform to a position parallel to the pedal body.

In one embodiment the apparatus further comprises a rotating float platform mounted centrally on a post on an upper surface of the pedal platform, the float platform enabled to rotate in a plane parallel with the plane of the upper surface of the pedal platform. Also in one embodiment the apparatus further comprises a layer of low-friction material between the float platform and the upper surface of the pedal platform. IN one embodiment there are adjustable stops between the pedal body and the foot platform on opposite sides of the second axis, the adjustable stops limiting angular rotation of the foot platform. Also in one embodiment there are adjustable anchor points for the spring elements, enabling adjustment of pressure exerted by the spring elements between the pedal body and the foot platform.

In one embodiment the spring elements are tension springs. In one embodiment the spring elements are compression springs. And in one embodiment the spring elements constitute one or more layers of resilient, rubber-like material disposed between the pedal body and the foot platform.

In one embodiment the mechanism for adjusting and securing position of the body at different positions along the direction of the axis of the pedal post comprises a threaded bolt through one end of the pedal body opposite the threaded portion of the pedal post, the threaded bolt engaging female threads along a bore having a common axis with the pedal post.

In another aspect of the invention an add-on orthotic device for a bicycle pedal, comprising a body with a downward-opening rectangular U-shape, a clamping mechanism enabling the body to be clamped at different positions along a conventional pedal having a pedal post, in a direction of a central axis of the pedal post, a layer of resilient, rubber-like material having a common thickness, the layer of material fixed to an upper surface of the body by a strong adhesive, and a rigid foot platform fixed to an upper surface of the layer of resilient, rubber-like material by a strong adhesive.

In one embodiment the clamping mechanism comprises clamp screws through one side of the body, enabling clamping the body to a pedal. Also in one embodiment the clamping mechanism comprises a clamping plate within the body engaged to clamping screws through the body. Also in one embodiment the add-on device further comprises a rotating float platform mounted centrally on a post on an upper surface of the foot platform, the float platform enabled to rotate in a plane parallel with the plane of the upper surface of the foot platform. And in one embodiment there is a layer of low-friction material between the float platform and the upper surface of the foot platform.

DETAILED DESCRIPTION OF THE INVENTION

Figure 1:
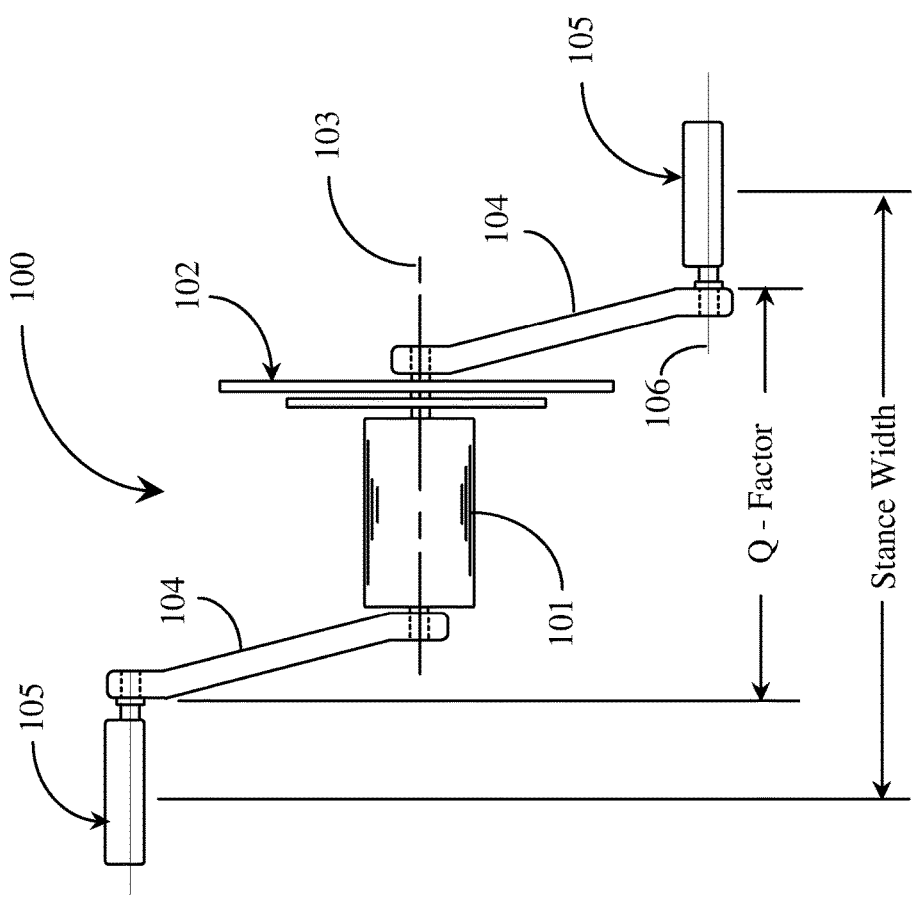
FIG. 1 is an elevation view of a crank and pedal apparatus in an embodiment of the present invention.

FIG. 1 is an elevation view of a crank and pedal apparatus 100 in an embodiment of the present invention. Two crank arms 104 are joined to extend in opposite directions from an axle on centerline 103 through bearings in a bracket 101. A set of sprockets 102 is shown as joined to the axle between the bracket and crank arm on one side.

Unique pedal assemblies 105 are pivotally joined to ends of the crank arms opposite where the crank arms join the axle. Details of the pedal assemblies are described below with reference to further figures. The crank arms are offset in this example to create additional distance between the pedals, and it will be apparent that the offset may be different in different instances, or there may be no offset. The crank offset influences Q-Factor, which is defined as the dimension between points where the opposite pedals join the crank arms, and influences stance width in the same way, stance width defined as the dimension between where a user's feet interact with the pedals. The skilled person will realize that the crank arms may be of different lengths in different embodiments, although typically the opposite crank arms will be of a common length.

Figure 2A:
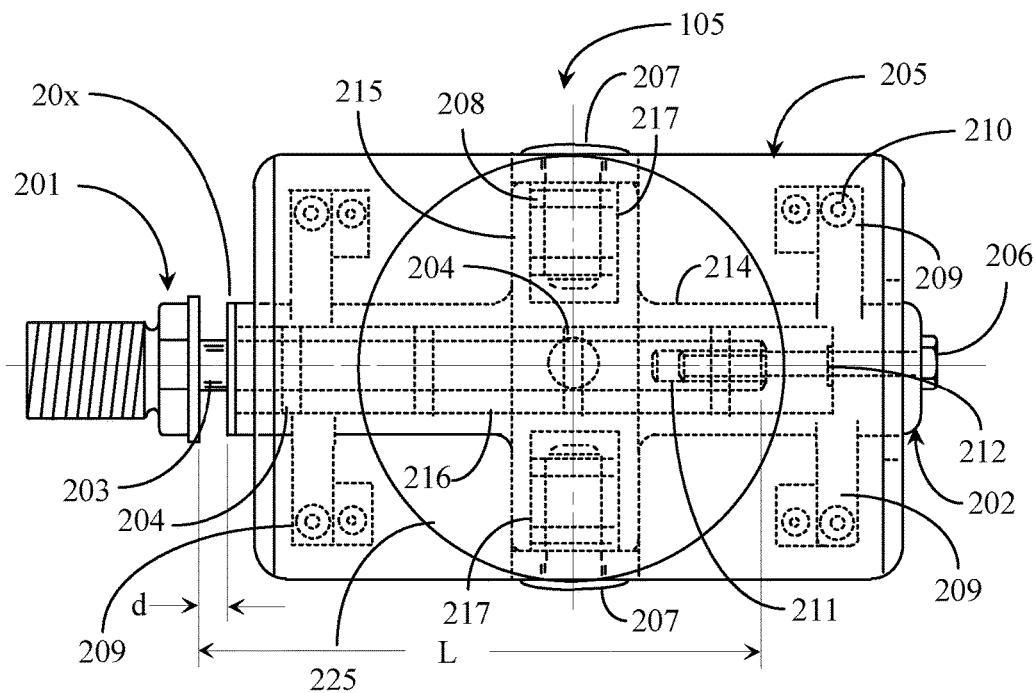
FIG. 2a is a plan view of one of pedal assemblies 105 in one embodiment of the invention.

FIG. 2a is a plan view of one of pedal assemblies 105 in one embodiment of the invention. There are four primary parts in this assembly, these being a pedal post 201 which assembles to the crank arm by a male threaded portion as is known in the art, a pedal body 202 which rotates on a shaft portion 203 of post 201, a pedal platform 205 which mounts rotationally to body 202 via pivot shafts 207 and is supported by body 202, and a float platform 225 that rides on a layer 227 of low-friction bearing material, and is rotationally mounted to platform 205 by a post 226 that is fixed in platform 205, but engages rotationally with float platform 225.

Figure 2B:
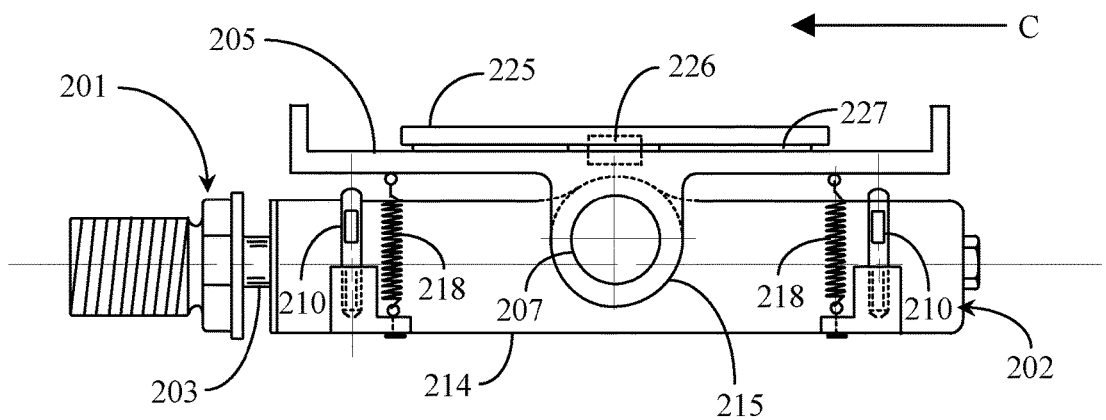
FIG. 2b is a side view of one of pedal assemblies 105 in one embodiment of the invention.

In the example shown body 202 may be a steel casting or a die casting, machined to provide proper bores for assembling to other parts of the pedal assembly. FIG. 2b is a side elevation view of the pedal assembly of FIG. 2a. Referring now to FIG. 2a, a bore 216 accommodates shaft 203, which engages with body 202 through a plurality of bearings 204, which may be, in one embodiment, ball bearings, but may be in another embodiment journal bearings. Bearings 204 are fixed in position in bore 216 in body 202, but shaft 203 is enabled to slide in the inner races of the bearings in the direction of the long axis of the shaft.

In this embodiment shaft 203 has a threaded bore 211 in the end opposite the end where the pedal post joins to the crank. Bore 211 engages a bolt 206 constrained by a keeper 212, such that turning the bolt in one rotary direction draws the pedal assembly toward the crank arm, and turning bolt 206 in the opposite direction translates the pedal assembly away from the crank arm. Bolt 206 is engaged in this embodiment in one or both of body 202 and shaft 203 in a close-fit manner, such that the bolt will not turn unless urged to do so by application of considerable torque applied to the bolt by a wrench. This feature prevents the position of pedal platform 205 from changing in use unintentionally. By turning bolts 206 in opposite pedal assemblies, stance width may be adjusted within the limits of the design.

It may be seen that body 206 has two distinct portions, these being portion 214 which accommodates bore 216 extending in the direction of shaft 203, and portion 215 which is elevated somewhat above portion 214, and extends at a ninety-degree angle to portion 214. Portion 215 has mirror-image bores 217 extending inward from each end, with bearings 208 mounted in the bores, to support pivot shafts 207, by which pedal platform 205 is rotationally mounted, such that the pedal platform may rotate a few degrees to allow for pronation and supination of the feet of different users.

In this embodiment body 202 has four integral extensions 209 for mounting stops 210 to limit rotational travel of pedal platform 205 about body portion 215. Stops 210 may be threaded posts that engage threaded holes in extensions 209. Posts 209 have flats for engaging a wrench to adjust the height of the post. In this example it is preferred that posts on opposite sides of body portion 214 be set at the same height. Extensions 209 also provide for anchoring tension springs 218, which in a preferred embodiment are pre-tensioned, so that as pedal platform 205 rotates side-to side, the springs will not completely relax. If the springs are identical then the spring force in each direction of rotation will be the same. In one embodiment mounting of each spring either above or below is adjustable in the direction of the spring force, so the force needed to rotate pedal platform 205 may be adjusted.

Rotationally-mounted float platform 225 provides heel float for a user, that is, enabling the user's heels to turn toward or away from the crank assembly while the ball of the user's foot is on the float platform. In some embodiments the upper surface of float platform 225 is striated or grained to provide a high degree of friction with the sole of a user's shoe.

Figure 2C:
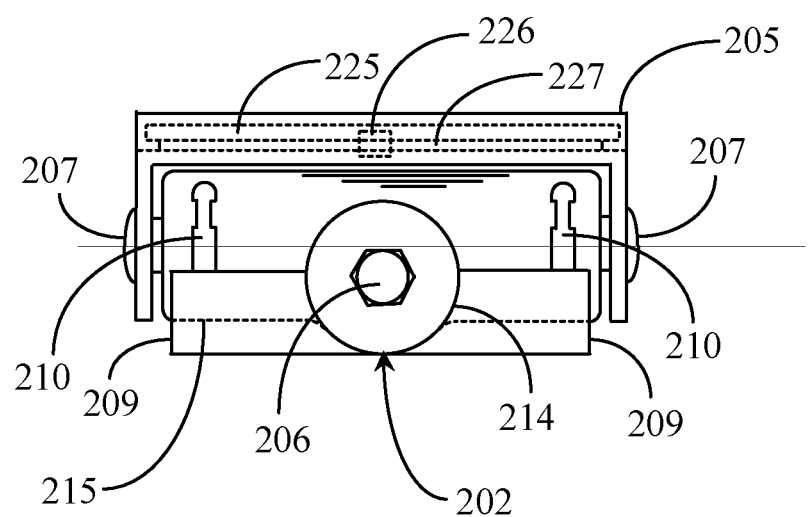
FIG. 2c is an end view of the pedal assembly of FIGS. 1, 2a and 2b in an embodiment of the invention.

FIG. 2c is an end view of the pedal assembly in the view direction "C" in FIG. 2b, showing essentially the same parts as shown in FIGS. 2a and 2b, but from the end viewpoint toward the crank. Springs 218 are not shown in FIG. 2c to avoid confusion.

Figure 3:
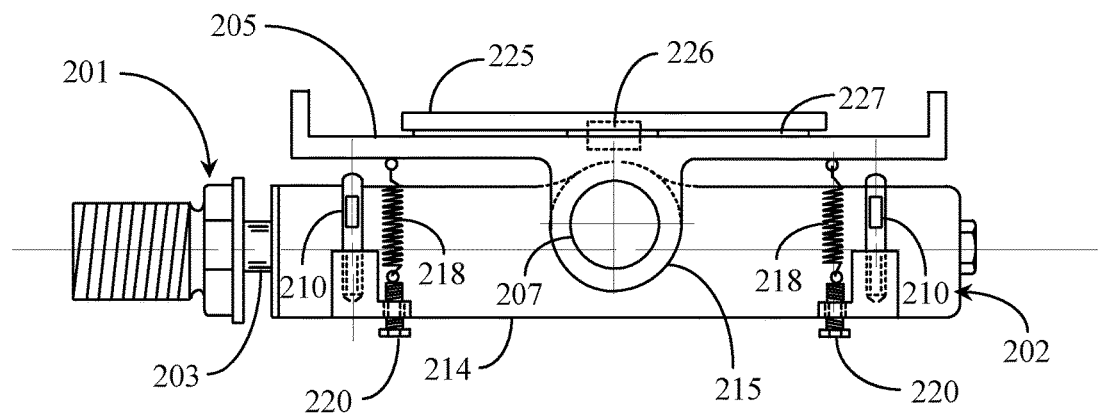
FIG. 3 is a side view of a pedal assembly in an embodiment of the invention illustrating an alternative arrangement for adjusting spring tension.

FIG. 3 is a side view of a pedal assembly in an embodiment of the invention illustrating an alternative arrangement for adjusting spring tension for springs 218. In this implementation springs 218 are shorter, and adjusting screws 220 (4) are provided with tapped holes in extensions 209 to adjust pre-tension in springs 218. Adjustment may be accomplished as well by substituting springs of different spring rate.

Figure 4:
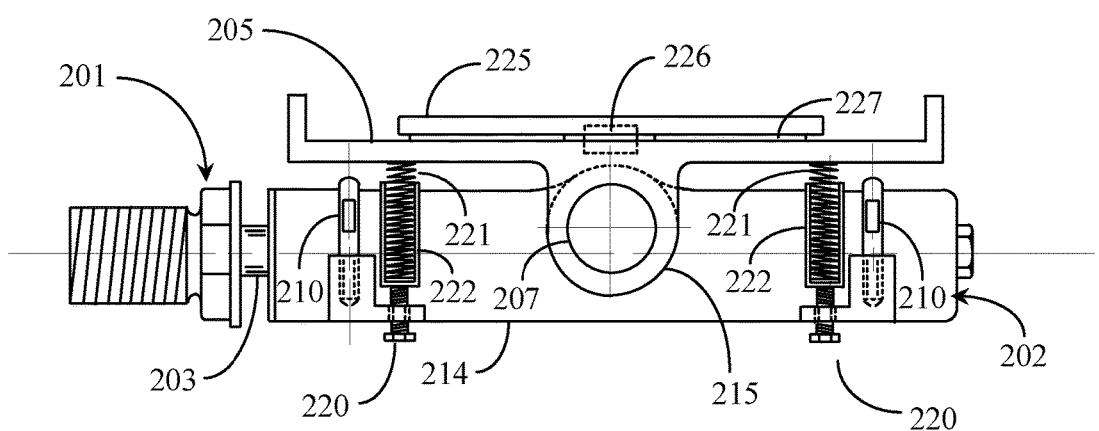
FIG. 4 is a side view of a pedal assembly in an embodiment of the invention illustrating another alternative arrangement for adjusting spring tension.

FIG. 4 is a side view of a pedal assembly in another embodiment illustrating another alternative arrangement for adjusting spring pressure for rotation of platform 205. In the implementation illustrated by FIG. 4 compression springs 221 are used instead of tension springs 218, and extensions 209 are structured to provide sufficient base retention for springs 221. Pressure for platform 205 can be adjusted by substituting springs of different lengths and of different spring rates. Adjustable cup pedestals 222 for springs 221 may be used as well to retain the springs and to adjust spring pressure.

Figure 5:
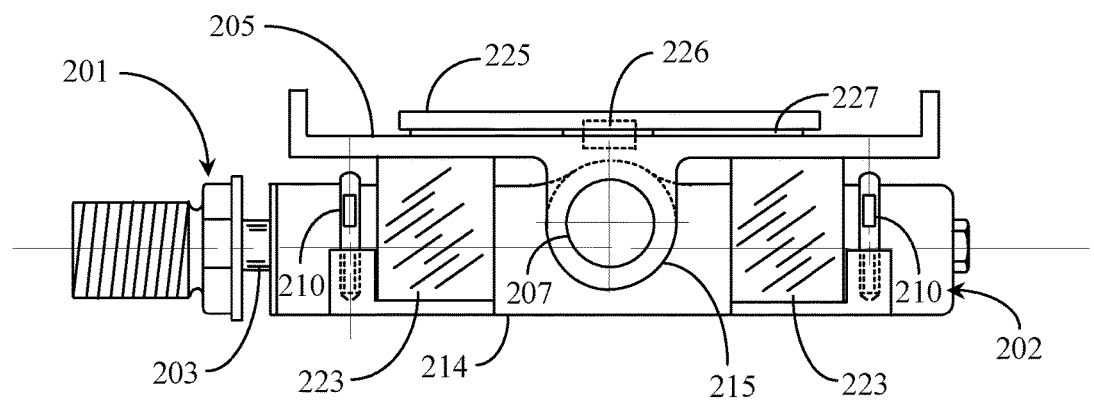
FIG. 5 is a side view of a pedal assembly in an embodiment of the invention illustrating yet another alternative arrangement for adjusting spring tension.

FIG. 5 is a side view of a pedal assembly in another embodiment illustrating another alternative arrangement for adjusting spring pressure for rotation of platform 205. In the arrangement of FIG. 5 resilient blocks 223, which may be made of rubber, synthetic rubber, or any one of a variety of polymers, are placed between extensions 209 and platform 205 to provide the necessary return force on each side of the rotation axis for platform 205. It will be apparent that the shape of the resilient blocks may vary in a number of ways, and that force on the platform may be adjusted by changing the blocks to blocks of a different material with a different spring rate.

Figure 6:
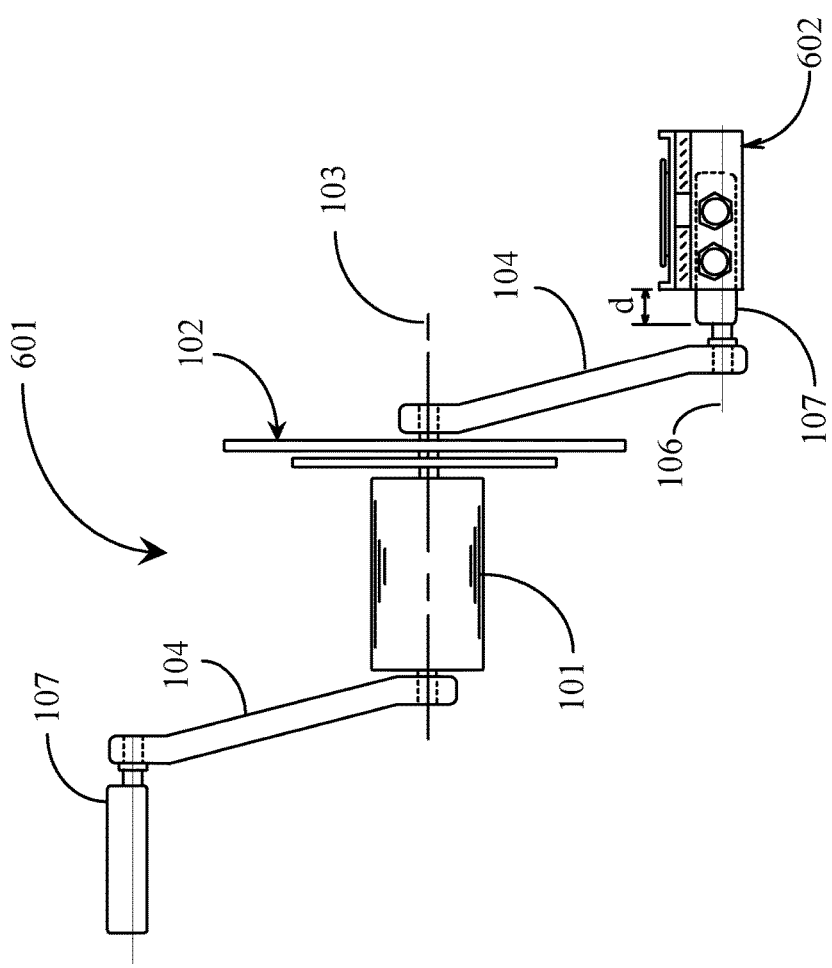
FIG. 6 is an elevation view of a crank and pedal apparatus including a conventional pedal, with an add-on apparatus engaged to the conventional pedal to provide functionality according to an embodiment of the present invention.

FIG. 6 is an elevation view of a crank and pedal apparatus 601 including conventional pedals 107, with an add-on apparatus 602 engaged to the conventional pedal to provide functionality according to an embodiment of the present invention. Apparatus 602 may be engaged to conventional pedal 107 at different points along the length of pedal 107, which adjusts the stance width, and if conditions warrant the opposite apparatus 602 may be engaged at a different point relative to the crank arm. In this example the add-on device has been secured at a dimension "d" away from the crank arm, compared to the conventional pedal. So the stance distance in this example, assuming an identical position of the pedal and device on the opposite crank arm, will be increased by 2×d. It is not necessary that both add-on devices attach at the same distance from the crank arms. Attachment implementation and other functions of apparatus 602 are described in detail below with reference to FIG. 7.

Figure 7:
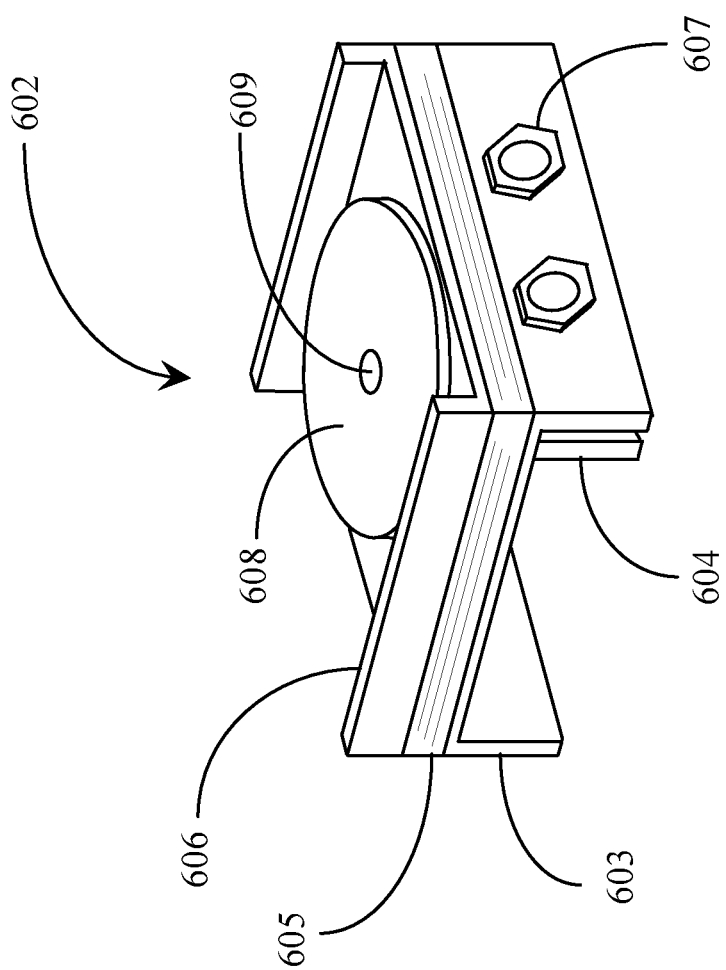
FIG. 7 is a perspective view of the add-on apparatus shown engaged to a conventional pedal in FIG. 6.

FIG. 7 is a perspective view of add-on apparatus 602 shown engaged to a conventional pedal in FIG. 6. Apparatus 602 in this embodiment comprises a U-shaped body 603. A clamping plate 604 is deployed inside body 603, and may be adjusted inward and outward by clamp screws 607, so body 603 may be placed over a conventional pedal at a desired position, and may be secured at that position by clamping to the conventional pedal. A float platform 608 is provided to rotate on a low-friction material on the top surface of platform 606, constrained by post 609, very much in the manner described above for float platform 225.

In this embodiment body 603 has a layer 605 of resilient, rubber-like material fixed to an upper surface of body 603 by a strong adhesive. Foot platform 606 is similarly fixed to an upper surface of the resilient layer, also by a strong adhesive. The spring rate of the resilient layer allows a user's foot to cant to the inside or the outside in operation of the crank assembly with the feet. The add-on device thus provides the functionality of the special pedal depicted in FIGS. 1 through 5.

In alternative embodiments of the add-on device platform 606 may be suspended on body 603 by an array of compression springs, rather than a layer of resilient material. IN other alternative embodiments platform 606 may have a pivot element under the platform in the direction of the width of a pedal, which may serve as a fulcrum for tilting of platform 606.

It will be apparent to the skilled person that the unique pedal assembly 105 depicted in FIGS. 1 through 5 provides for adjusting for stance width, for supination and for pronation within an adjustable range, and for pedal tilt "pushback" provided by adjustable springs 218, as well as providing heel float. The skilled person will also recognize that the add-on device depicted in FIGS. 6 and 7 may provide essentially the same functionality. The skilled person will also understand that the mechanical design depicted in the figures is but one design among many that may provide the functionality intended in the invention. For example, there are a number of ways the spring rate pedal pushback may be accomplished. There are similarly several ways that pedal position along the mounting shafts might be accomplished, such as by sliding the pedals to a position to be locked by, for example, set screws. Alternative mechanical contrivances for accomplishing the inventive functionality should be considered as within the scope of the invention.

In one embodiment of the invention the inventor provides a stationary bicycle having a crank arrangement fitted with pedals according to an embodiment of the present invention. In one embodiment video equipment is provided for filming a client using the stationary bicycle under a variety of different adjustments of the various adjustable parameters provided in embodiments of the invention. Such videos provide to a skilled person having special knowledge of user movements in response to the apparatus and ability to set up the crank and pedal assembly optimally for different users. The skilled observer may also optimally adjust the apparatus for a particular user by direct observation and adjustment. In some embodiments indicators and scribe marks may be provided to record the settings for stance width and for spring settings.

The invention claimed is:

1. An orthotic pedal apparatus for a bicycle, comprising:
a pedal post having a first axis, a male threaded portion at a first end, and a female-threaded bore at a second end, opposite the first end;
a pedal body having a linear bore with bearings mounting the pedal body rotationally and translationally on the pedal post, and a threaded bolt secured rotationally in the pedal body, with threads engaged in the female-threaded bore at the second end of the pedal post, such that turning the threaded bolt adjusts and secures the pedal body at different positions along a direction of the first axis of the pedal post;

a foot platform mounted rotationally above the pedal body to rotate on a second axis at a right angle to the first axis of the pedal post, the foot platform having spring elements between the pedal body and the foot platform on opposite sides of the second axis, the spring elements tending to return the foot platform to a position parallel to the pedal body;

threaded posts engaged in threaded holes in the pedal body on the opposite sides of the second axis, providing adjustable solid stops between the pedal body and the foot platform, limiting arc of rotation of the foot platform; and a rotating float platform mounted centrally on a post on an upper surface of the foot platform, the rotating float platform enabled to rotate in a plane parallel with a plane of the upper surface of the pedal platform.

2. The orthotic pedal apparatus of claim 1 further comprising a layer of low-friction material between the float platform and the upper surface of the foot platform.

3. The orthotic pedal apparatus of claim 1 further comprising adjustable anchor points for the spring elements, enabling adjustment of pressure exerted by the spring elements between the pedal body and the foot platform.

4. The orthotic pedal apparatus of claim 1 wherein the spring elements are tension springs.

5. The orthotic pedal apparatus of claim 1 wherein the spring elements are compression springs.

6. The orthotic pedal apparatus of claim 1 wherein the spring elements constitute one or more layers of resilient, rubber-like material disposed between the pedal body and the foot platform.

* * * * *